(12) United States Patent
Seaver

(10) Patent No.: US 12,269,590 B2
(45) Date of Patent: Apr. 8, 2025

(54) INFLATABLE WING WITH DEFLECTION

(71) Applicant: Kael Seaver, Chicago, IL (US)

(72) Inventor: Kael Seaver, Chicago, IL (US)

(*) Notice: Subject to any disclaimer, the term of this patent is extended or adjusted under 35 U.S.C. 154(b) by 10 days.

(21) Appl. No.: 18/227,481

(22) Filed: Jul. 28, 2023

(65) Prior Publication Data

US 2025/0033757 A1 Jan. 30, 2025

(51) Int. Cl.
*B64C 3/18* (2006.01)
*B64C 3/30* (2006.01)
*B64C 29/00* (2006.01)

(52) U.S. Cl.
CPC ............... *B64C 3/30* (2013.01); *B64C 3/185* (2013.01); *B64C 29/0025* (2013.01)

(58) Field of Classification Search
CPC .. B64C 1/34; B64C 3/14; B64C 3/185; B64C 3/30; B64C 3/385; B64C 3/40; B64C 3/42; B64C 3/44; B64C 3/46; B64C 3/48; B64C 3/54; B64C 5/10; B64C 29/0025; B64C 2003/142; B64C 2003/445; B64C 2003/543; B64C 2031/065
USPC .................................................... 244/123.11
See application file for complete search history.

(56) References Cited

U.S. PATENT DOCUMENTS

| | | | |
|---|---|---|---|
| 2,979,287 A | 4/1961 | Ross | |
| 3,118,639 A * | 1/1964 | Kiceniuk | B64C 3/46 244/123.6 |
| 3,139,244 A | 6/1964 | Bright | |
| 3,957,232 A * | 5/1976 | Sebrell | B64C 3/30 428/188 |
| 5,971,328 A | 10/1999 | Kota | |
| 6,082,667 A * | 7/2000 | Haggard | B64C 3/30 244/35 R |
| 6,199,796 B1 * | 3/2001 | Reinhard | B64C 3/30 244/35 R |
| 6,347,769 B1 * | 2/2002 | To | B64C 3/46 244/219 |
| 7,137,592 B2 * | 11/2006 | Barocela | B64B 1/24 244/123.11 |
| 7,185,851 B2 * | 3/2007 | Elam | B64U 30/12 52/2.13 |

(Continued)

FOREIGN PATENT DOCUMENTS

CN 104276281 A 1/2015
CN 105438444 B 3/2016

(Continued)

OTHER PUBLICATIONS

"Inflatable Aviation," Aircraft Enthusiasts' Group, retrieved from https://www.a-e-g.org.uk/inflatable-aviation.html on Jun. 5, 2023, 5 pages.

(Continued)

*Primary Examiner* — Joshua E Rodden
(74) *Attorney, Agent, or Firm* — Foley & Lardner LLP

(57) ABSTRACT

A wing of a vehicle can include a rigid spar. The wing can include beams configured to inflate with a gas. The beams can be disposed from a leading edge of the wing to a trailing edge of the wing. The wing can include a component coupled with the rigid spar and coupled with the trailing edge of the wing, the component to deflect the trailing edge of the wing relative to the leading edge and curve the plurality of beams.

20 Claims, 8 Drawing Sheets

(56) References Cited

U.S. PATENT DOCUMENTS

| | | | | |
|---|---|---|---|---|
| 8,342,451 | B1* | 1/2013 | Lutke | B64C 1/34 |
| | | | | 244/123.1 |
| 8,727,280 | B1* | 5/2014 | Lutke | B64U 30/12 |
| | | | | 244/123.11 |
| 11,021,228 | B2* | 6/2021 | Prokhorov | B64C 3/46 |
| 2005/0151007 | A1* | 7/2005 | Cadogan | B64U 20/70 |
| | | | | 244/35 R |
| 2008/0083847 | A1 | 4/2008 | Mau | |
| 2011/0192933 | A1* | 8/2011 | Guering | B64D 27/40 |
| | | | | 244/54 |
| 2021/0245862 | A1* | 8/2021 | Shields | B64C 3/52 |
| 2024/0166331 | A1* | 5/2024 | Tulloch | B64D 37/30 |

FOREIGN PATENT DOCUMENTS

| | | | |
|---|---|---|---|
| CN | 114435578 B | 10/2022 | |
| RU | 2706678 C1 * | 11/2019 | |
| WO | WO-9803398 A1 * | 1/1998 | B64C 3/30 |

OTHER PUBLICATIONS

Aircraft Enthusiasts' Group, "Inflatable Aviation," Jan. 2020, https://www.a-e-g.org.uk/inflatable-aviation.html, site visited Jul. 17, 2023.

Breuer, et al., "An inflatable wing using the principle of Tensairity," 48th AIAA/ASME/ASCE/AHS/ASC Structures, Structural Dynamics, and Materials Conference, AIAA 2007-2117, 12 pages (2007).

Jacob, et al., "Design and Flight Testing of Inflatable Wings with Wing Warping," Society of Automotive Engineers, 05WAC-61, 10 pages (2005).

Malm, et al., "Experimental characterization and finite element analysis of inflated fabric beams," Construction and Building Materials 23(5), pp. 2027-2034 (2009).

Murray, et al., "Ground and Flight Evaulation of a SmallScale Inflatable-Winged Aircraft," NASA/TM-2002-210721, 21 pages (2002).

Stoll, et al., "Drag Reduction Through Distributed Electric Propulsion," 14th AIAA Aviation Technology, Integration, and Operations Conference, AIAA 2014-2851, 10 pages (2014).

* cited by examiner

INFLATABLE WING WITH DEFLECTION

INTRODUCTION

A vehicle, such as an aircraft, can include a wing. The wing can direct air to achieve lift for the vehicle.

SUMMARY

At least one aspect is directed to a wing of a vehicle. The wing can include a rigid spar. The wing can include beams configured to inflate with a gas, the plurality of beams disposed from a leading edge of the wing to a trailing edge of the wing. The wing can include a component coupled with the rigid spar and coupled with the trailing edge of the wing, the component to deflect the trailing edge of the wing relative to the leading edge and curve the plurality of beams.

The component can apply a force to the trailing edge of the wing to curve a shape of the wing formed by the plurality of beams.

The wing can include a propulsion system coupled with the rigid spar.

The wing can include a distributed electric propulsion system coupled with the rigid spar. The distributed electric propulsion system can be configured to actuate while the trailing edge of the wing is deflected relative to the leading edge of the wing at an angle between seventy and ninety degrees to perform a vertical take-off or landing.

The wing can include a distributed electric propulsion system coupled with the rigid spar. The distributed electric propulsion system can be configured to actuate while the trailing edge of the wing is deflected relative to the leading edge of the wing to perform a take-off or landing on a runway of a length equal to or less than 1,500 feet.

The wing can include beams that form an airfoil shape.

The wing can include cables that extend from a base of the wing within the rigid spar. The cables can include a first cable to extend from the rigid spar toward a top of the wing to a first point, and from the first point to the trailing edge of the wing. The cables can include a second cable to extend from the rigid spar toward a bottom of the wing to a second point, and from the second point to the trailing edge of the wing.

The wing can include cables that extend from the rigid spar to an outer surface of the wing. The wing can include a sleeve coupled on the outer surface of the wing, wherein the plurality of cables are disposed within the sleeve.

The wing can include a first cables to extend from the rigid spar towards a first surface of the wing. The wing can include second cables to extend from the rigid spar towards a second surface of the wing. The wing can include at least one actuator to tighten the first cables and loosen the second cables together to control positive or negative camber of at least a portion of the trailing edge of the wing.

The wing can include a support arm coupled with the rigid spar, the support arm to extend from the rigid spar below a chord of the wing. The wing can include a propulsion system coupled with the support arm.

The wing can include a sheet of fabric or an elastic material to cover the plurality of beams, the sheet of fabric or the elastic material to flex with the plurality of beams.

The wing can include a cable controlled by an actuator disposed within a fuselage of the vehicle or the rigid spar of the wing, the cable to deflect the trailing edge of the wing relative to the leading edge.

The wing can include a cable controlled by an actuator disposed within a fuselage of the vehicle or the rigid spar of the wing, the cable to deflect a portion of the trailing edge of the wing relative to the leading edge to cause the vehicle to roll.

The rigid spar can be positioned at a maximum thickness of the wing or immediately next to a beam of the plurality of beams positioned at the maximum thickness of the wing.

The wing can include a material that forms an outer surface of the wing and a cavity, the plurality of beams disposed within the cavity. The cavity can be pressurized separately from the plurality of beams.

The component can include a shape memory alloy coupled with the rigid spar, the shape memory alloy to deflect the trailing edge of the wing relative to the leading edge.

At least one aspect is directed to a method. The method can include providing a rigid spar in a wing of a vehicle. The method can include disposing a plurality of beams from a leading edge of the wing to a trailing edge of the wing. The method can include inflating the plurality of beams with a gas. The method can include actuating a component coupled with the rigid spar and coupled with the trailing edge of the wing to deflect the trailing edge of the wing relative to the leading edge and curve the plurality of beams.

The method can include providing a plurality of cables to extend from a base of the wing within the rigid spar. A first cable of the cables can extend from the rigid spar toward a top of the wing to a first point, and from the first point to the trailing edge of the wing. A second cable of the cables can extend from the rigid spar toward a bottom of the wing to a second point, and from the second point to the trailing edge of the wing.

The method can include disposing a plurality of cables that extend from the rigid spar to an outer surface of the wing within a sleeve coupled on the outer surface of the wing.

At least one aspect of the present disclosure is directed to an aircraft. The aircraft can include a wing. The wing can include a rigid spar. The wing can include a propulsion system coupled with the rigid spar. The wing can include beams configured to inflate with a gas, the beams disposed from a leading edge of the wing to a trailing edge of the wing. The wing can include a component coupled with the rigid spar and with the trailing edge of the wing, the component to deflect the trailing edge of the wing relative to the leading edge and curve the beams.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
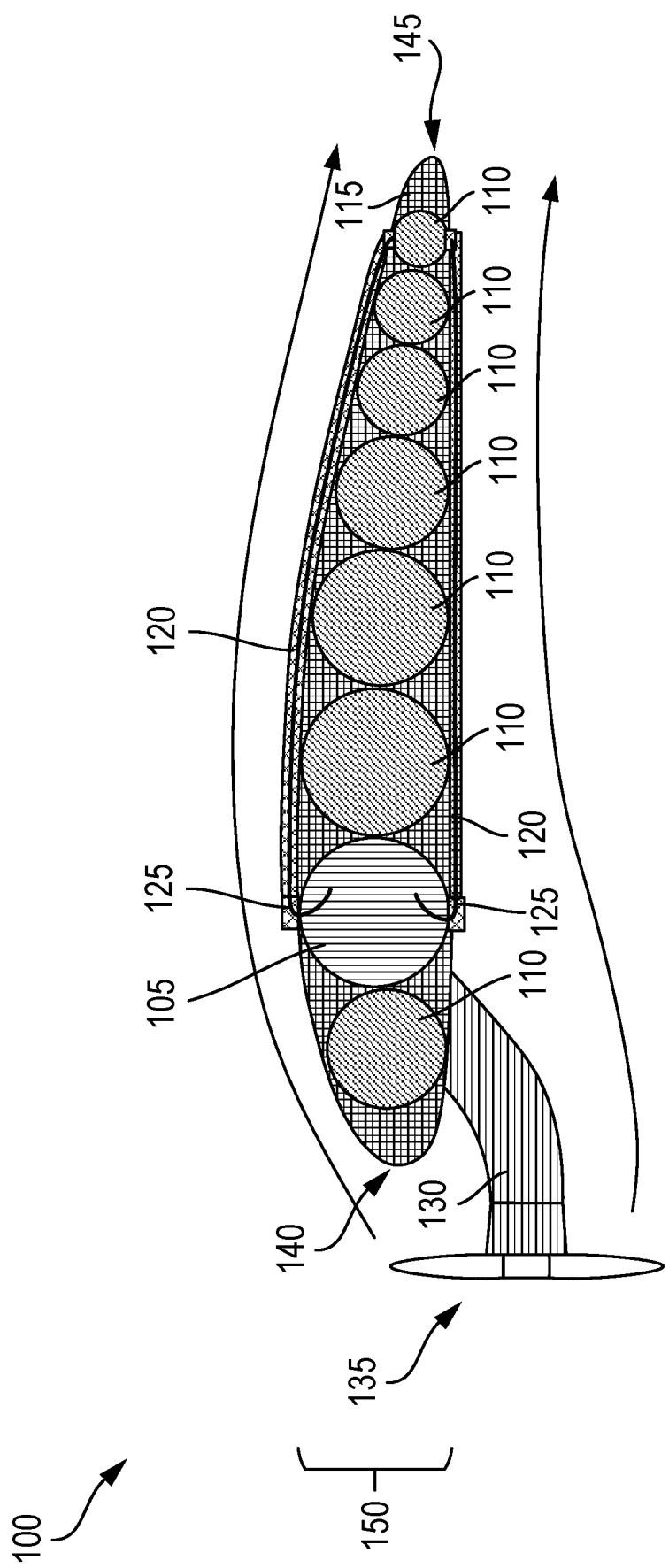
FIG. 1 depicts an example wing including a rigid spar, beams that inflate, and a component to deflect the wing.

Following below are more detailed descriptions of various concepts related to, and implementations of, methods, apparatuses, and systems of an inflatable wing with deflection. The various concepts introduced above and discussed in greater detail below may be implemented in any of numerous ways.

This disclosure is generally directed to techniques for an inflatable wing with deflection. A wing of an aircraft can include mechanical flaps, such as a metal or aluminum flaps. The flaps can be hinged panels that can reduce take-off or landing distance. The flaps can be in multiple layers or surfaces and can be linked by a complex mechanical linkage system and include small mechanical parts (e.g., joints, brackets, pins, etc.). This can make the flaps difficult to design and manufacture, and can result in increased design, manufacturing, and materials costs. Furthermore, the flaps can require maintenance or replacement due to their mechanical linkage, complexity, and small moving parts. Furthermore, the flaps may require lubrication, and therefore require periodic servicing. Because the flaps are metal, the vehicle can include increased weight, resulting in additional energy consumption by the vehicle to take-off, land, and fly.

Furthermore, the flaps may not sufficiently divert or direct an airstream or slipstream of a propulsion system for the aircraft to perform VTOL or STOL. A VTOL take-off or landing can be a maneuver where the vehicle takes-off or lands without requiring or relying on a runway. VTOL can be a take-off or landing straight upwards or downwards in a direction perpendicular to a surface that the vehicle is taking off from or landing on. A STOL take-off or landing can be a maneuver where the vehicle takes-off or lands on a shortened, shorter, or short runway, for example, a runway of a length equal to or less than 1,500 feet (450 meters), 1,000 feet (305 meters), 900 feet (274 meters), etc. A STOL takeoff may be a takeoff where the vehicle can clear a 50-foot (15 meter) obstacle at the end of the runway. A STOL landing can be a landing where the vehicle can land on the runway after clearing the 50-foot obstacle at the beginning of the runway.

To solve these and other technical problems, this technical solution can include an inflatable wing with deflection. A vehicle can include at least one wing including at least one rigid spar, at least one beam configured to inflate, and at least one component coupled with the rigid spar that deflects a trailing edge of the wing relative to the leading edge. The rigid spar can extend along a length of the wing in the spanwise direction at approximately a one-quarter chord location. The rigid spar can provide structural support for the wing. The rigid spar can support at least one propulsion system, device, or apparatus on or near the wing. Each wing can include one, two, or any number of propulsion systems. The propulsion systems can be positioned or disposed below the leading edge of the wing.

The wing, or a portion of the wing such as a back portion of the wing beginning at approximately 30-40% of the chord, can be constructed from a series of variable diameter inflatable beams extending along a length of the wing in the spanwise direction, parallel to the rigid spar. The series of parallel variable diameter air beams can be connected in a row to create an airfoil shape, e.g., a rough airfoil shape or an approximate airfoil shape. A sheet of fabric or an elastic material can cover the series of inflatable beams to make a smooth airfoil shaped outer skin around the inflatable beams, without compromising flexibility of the back portion of the wing. A component, apparatus, or system, such as a pully and cable system, can be coupled with the rigid spar and the trailing edge of the wing. For example, the pulley and cable system can couple with multiple points on the trailing edge of the wing. An actuator can be disposed within the fuselage of the vehicle or the spar and operate the pulley and cable system to curve, bend, or morph the shape of the wing. For example, pulley cables can run along the top and bottom sides of the flexible portion of the wing through sleeves that constrain the cables to stay taught against the surface of the wing. These sleeves can keep the cables in a determined position such that when the top cables contract the wing can curve upwards (negative camber), and when the bottom cables contract the wing can curve downwards (positive camber). The rigid spar can provide support such that a tensile or pulling force created by the component between the spar and the trailing edge of the wing can deflect the trailing edge of the wing upwards or downwards.

The actuator and pulley system can pull the trailing edge of the wing down (adding positive camber) to the point where the slipstream generated by the propulsion system is directed downwards or straight down, producing vertical thrust that can enable VTOL. Furthermore, the trailing edge can be deflected downwards to an angle between 30 and 60 degrees from horizontal to enable STOL. A cable or other actuation mechanism connected to the trailing edge wing tip can be isolated from the other cables or actuators such that the deflection of the wing tip is independent of the deflection of the rest of the trailing edge of the wing. This independent control of the wing tip trailing edge angle can enable wing warping that gives the aircraft roll control.

Referring now to FIG. 1, among others, an example wing 100 including a rigid spar 105, beams 110 that inflate, and a component 125 to deflect the wing is shown. FIG. 1 depicts a cross-section of the wing 100. The wing 100 can be a wing of a vehicle, such as an airplane, helicopter, submarine, drone, boat, or any other vehicle. The wing 100 can be fixed, coupled, fixedly coupled, or attached to the vehicle, such as a fuselage or body of the vehicle. The vehicle can include at least one wing 100. For example, the vehicle can include a first wing 100 disposed on a first side of the vehicle, and a second wing disposed on an opposite side of the vehicle. The vehicle can include multiple wings 100 disposed on the same side of the vehicle. The wing 100 can include a leading edge 140 and a trailing edge 145. When the vehicle moves towards a location, point, or objective, the edge 140 can lead the edge 145.

The wing 100 can include at least one component, element, member, beam, or spar 105. The spar 105 can be rigid and resist a flexing or bending force. The spar 105 can include or be an aluminum, carbon fiber, plastic, or other material. The spar 105 can be rigid such that the spar 105 can support the weight, or a portion of the weight, of the wing 100. The spar 105 can have or be a cylindrical shape. The spar 105 can be or have a cylindrical capsule shape. The spar 105 can be a cylindrical shape with hemispheres on opposite ends of the cylinder. A longitudinal axis of the spar 105 can be perpendicular to a longitudinal axis of the vehicle.

The spar 105 can be disposed in the wing 100 between the leading edge 140 of the wing 100 and the trailing edge 145 of the wing 100. The spar 105 can be disposed a distance from the leading edge 140 that is less than a distance from the trailing edge 145 (e.g., the spar 105 can be closer to the leading edge 140 than the trailing edge 145). For example, measuring the chord from the leading edge 140 of the wing 100, the spar 105 can be disposed at a point 24-26% of the chord. For example, measuring the chord from the leading edge 140 of the wing 100, the spar 105 can be disposed at a point 20-30% of the chord. For example, measuring the chord from the leading edge 140 of the wing 100, the spar 105 can be disposed at a point less than 20% of the chord. For example, measuring the chord from the leading edge 140 of the wing 100, the spar 105 can be disposed at a point more than 30% of the chord but less than 50% of the chord. The spar 105 can be disposed at a point of the wing 100 where the wing has a maximum or greatest thickness 150. The spar 105 can be disposed at a point of the wing 100 next to, immediately next to, or touching a beam 110 disposed at a maximum or greatest thickness 150.

The wing 100 can include at least one beam 110. The wing 100 can include beams 110 disposed from the leading edge 140 to the trailing edge 145. The beams 110 can be disposed in a set or in a series. The beams 110 can be an airtight or gastight fabric tube. The beams 110 can be air beams. The beams 110 can be internally pressurized such that the beams resist bending. The beams 110 can have or be a cylindrical shape. The beams 110 can be or have a cylindrical capsule shape. The beams 110 can be a cylindrical shape with hemispheres on opposite ends of the cylinder. Longitudinal axes of the beams 110 can be perpendicular to a longitudinal axis of the vehicle. Each beam 110 can include a valve or other opening allowing a gas to be pumped or compressed into the beams 110. A compressor, pressure tank, or other device can supply gas to the beams 110 through the valves. Each beam 110, or at least some of the beams, can be pressurized individually. The beams 110 can be pressurized with air, helium, hydrogen, ammonia, methane, or any other lifting gas or gas. The beams 110 can be pressurized with a gas that has a weight that is the same as, or substantially the same as, air. The beams 110 can be pressurized with a gas that is lighter than air.

Each beam 110 can touch or be positioned close to other beams 110 (e.g., less than half a foot, less than four inches, less than 1 inch). The beams 110 can be free from each other in the wing 100, touch each other, or be coupled with each other. The beams 110 can increase in diameter, radius, or circumference from the leading edge 140 of the wing to the rigid spar 105. For example, a first beam 110 disposed closest to the leading edge 140 can have a first diameter, radius, or circumference. A second beam 110 (not shown) disposed next to the first beam 110 (the second most closest beam to the leading edge 140) can have a second diameter greater than the first diameter, a second radius greater than the first radius, or a second circumference greater than the first circumference. Sequential beams 100 can continue to increase in diameter, radius, or circumference from the leading edge 140 to the rigid spar 105. The rigid spar 105 can have the greatest or a maximum cross-sectional diameter, radius, or circumference compared to the beams 110. The rigid spar 105 can have the same diameter, radius, or circumference of the largest beam 110.

From the rigid spar 105 to the trailing edge 145, the beams 110 can decrease in diameter, radius, or circumference. For example, a third beam 110 closest to the rigid spar 105 that is positioned between the rigid spar 105 and the trailing edge 145 can have a third diameter, radius, or circumference. For example, a fourth beam 110 next to the third beam 110 that is positioned between the rigid spar 105 or the trailing edge 145 can have a fourth diameter, radius, or circumference less than the third diameter, radius, or circumference. The beams 110 can continue to decrease in diameter, radius, or circumference from the rigid spar 105 to the trailing edge 145. Furthermore, from the trailing edge 145 to the rigid spar 105, the beams 110 can sequentially increase in diameter, radius, or circumference.

Figure 2:
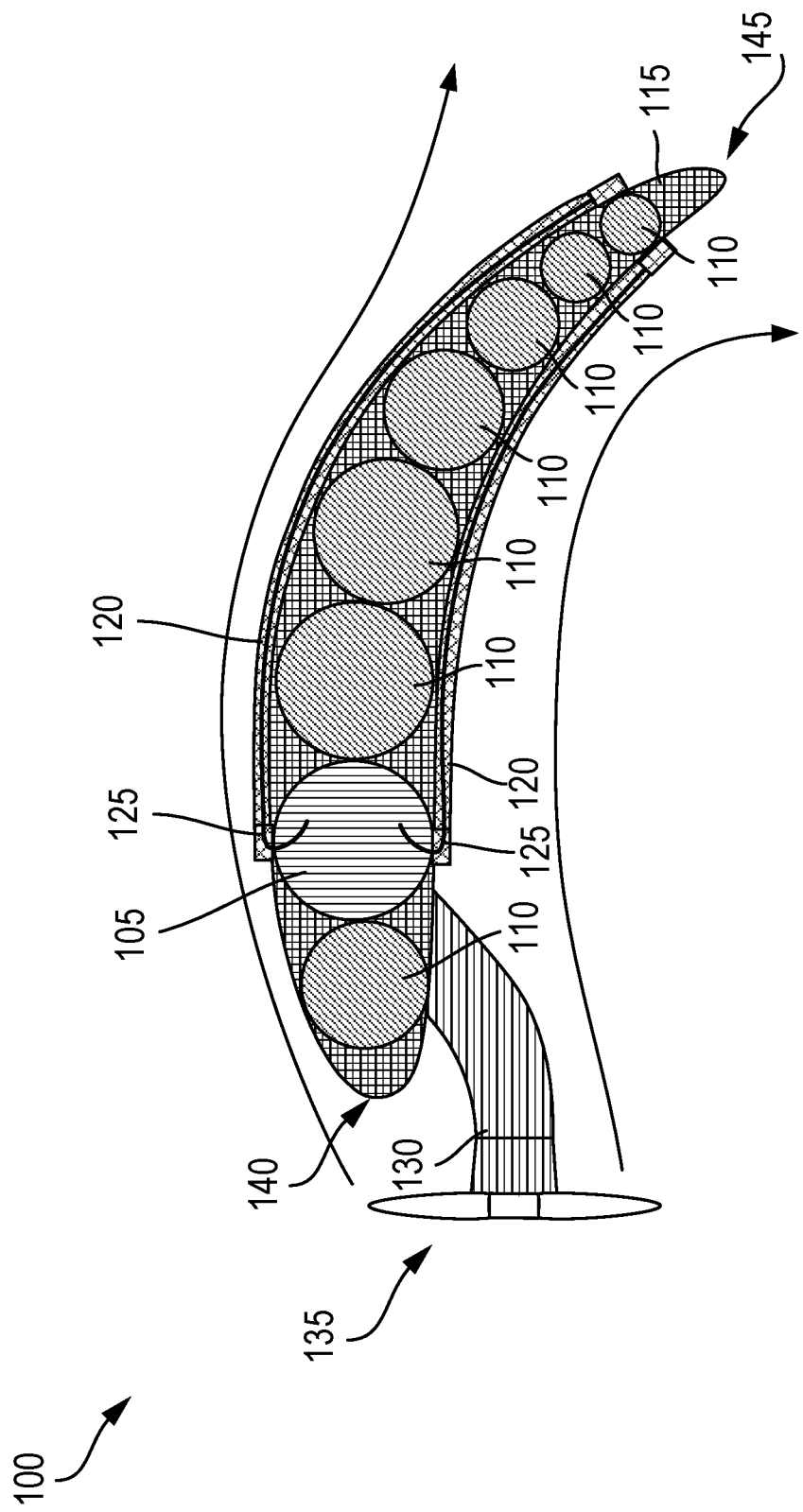
FIG. 2 depicts an example wing including a rigid spar, beams that inflate, and a component to deflect the wing for short take-off and/or landing (STOL).
Figure 3:
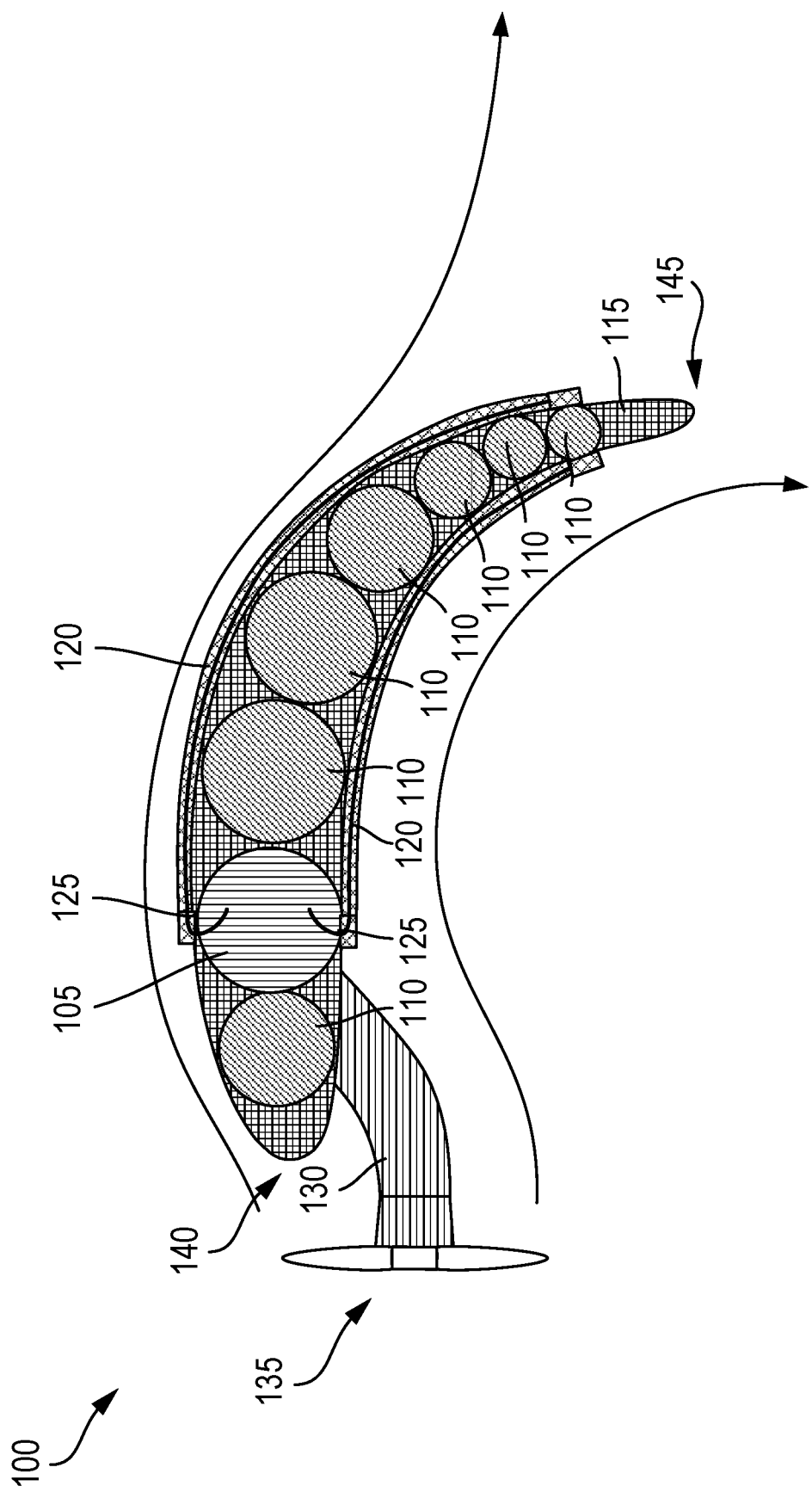
FIG. 3 depicts an example wing including a rigid spar, beams that inflate, and a component to deflect the wing for vertical take-off and/or landing (VTOL).

Circular or oval shape cross sections of the beams 110 and the rigid spar 105 can be disposed on a straight line. For example, a straight line can be tangent to the bottom side of each beam 110 and the rigid spar 105. Alternatively, the straight line can pass through a center or middle of a circular or oval shaped cross section of the beams 110 and the rigid spar 105. In FIG. 1, the wing 100 can be in a cruise form to allow the vehicle to cruise or fly after take-off or before landing. When the components 125 contract or loosen, as shown in FIGS. 2 and 3, the line that the beams 110 and the rigid spar 105 are disposed on can bend, curve or deflect, and therefore the shape of the wing formed by the beams 110 can bend or curve. For example, the shape of the wing can bend downwards such that the trailing edge 145 of the wing 100 moves relative to the leading edge 140, e.g., downward towards a surface under the vehicle, or downwards towards the arm 130 or the propulsion system 135.

The wing 100 can include a material 115 that forms an outer surface of the wing 100. Beams 110 and the rigid spar 105 can form a rough airfoil shape, e.g., a jagged airfoil shape, or a frame of an airfoil shape. The material 115 can be disposed over the beams 110 and the rigid spar 105 to smooth the airfoil shape of the wing 100. The material 115 can be a plastic material, a fabric, an elastic material or any other flexible material. The material 115 can form a cavity, opening, or space where the beams 110 and the rigid spar 105 are disposed. The cavity formed by the material 115 can be inflated, pressurized, or filled with a gas. The cavity of the material 115 can be pressurized separately from the pressurization of the beams 110. The material 115 can be a fabric or elastic material that covers the beams 110 and the rigid spar 105 that can flex or bend with the plurality of beams 110. The material 115 can be flexible such that the wing 100 can bend as shown in FIGS. 2 and 3.

The wing 100 can include at least one component 125. The components 125 can be coupled with the rigid spar 105 and/or coupled with the trailing edge 145 of the wing 100. For example, a first end can be coupled with the rigid spar 105 or the trailing edge 145 via a hook, weld, eyelet, snap, adhesive, or glue. The components 125 can expand or contract, pull or push, or otherwise exert a tension force between the rigid spar 105 and the trailing edge 145 (e.g., to an air beam 110 closest to the trailing edge 145). Changes to the tension between the rigid spar 105 and the trailing edge 145 can change the shape of the wing 100, deform the wing, morph the shape of the wing, bend the shape of the wing 100, or deflect the trailing edge 145 of the wing 100 relative to the leading edge of the wing 100 or relative to the rigid spar 105. When the components 125 deflect the trailing edge 145 of the wing, the beams 110 can change shape, e.g., curve, bend, deform, or morph. For example, a straight line that connects centers or middle points of the beams 110 and the rigid spar 105 or a straight line that forms a tangent with the beams 110 and the rigid spar 105 can curve downwards or upwards to give the wing 100 positive or negative camber or increase or decrease the positive or negative camber of the wing 100. When the tensions of the components 125 change, the beams 110 and the rigid spar 105 can roll on each other to form a new shape. For example, curved or circular surfaces of the beams 110 and the rigid spar 105 can roll on each other to change the shape of the wing 100.

The components 125 can be cables, pulleys, a cable system, a cable apparatus, a wing warping cable, a pulley apparatus, a pulley system, telescoping members, wires, threads, shape memory alloys, linear actuators, electroactive polymers, or any other component that can control the shape or deformation of the wing 100 to increase or decrease camber. The cables 125 can be at least partially disposed within the rigid spar 105. For example, the cables 125 can extend out of the rigid spar 105. The cables 125 can extend out through openings in an outer surface 115 of the wing 100 into at least one sleeve 120. The cables 125 can extend through the sleeves 120 towards the trailing edge 145 of the wing. For example, the cables 125 can pass through an opening in the material 115, enter into the sleeves 120, extend through the sleeves 120 towards the trailing edge 145 of the wing 100, and then couple with the material 115 under the sleeve 120 or extend back into the wing 100 out of the sleeve 120 through an opening in the material 115, and then couple with the material 115 or directly with one of the beams 110 (e.g., a beam 110 closest to the trailing edge 145). The openings in the material 115 can be airtight with the cables 125. The material can be pressurized with the sleeves 120, in some implementations.

The cables 125 can be at least partially disposed within a fuselage of the vehicle. The wing 100 can include sleeves 120 coupled on or with a top surface 115 of the wing 100 and with a bottom surface 115 of the wing 100. The sleeve 120 can be stitched, adhered, or glued to the surface 115 of the wing 100. The sleeves 120 can include openings, cavities, spaces, conduit, pipes, or another component or area for the cables 125 to extend through. The cables 125 can extend from the fuselage of the vehicle through the rigid spar 105, and from the rigid spar 105 towards a top surface or a bottom surface of the vehicle to a point, and then from the point towards or to the trailing edge 145 of the wing 100.

One or multiple first cables 125 can extend from the rigid spar 105 upwards towards a top surface 115 of the wing 100 to a point or to multiple points, and from the point or points towards the trailing edge 145 of the wing 100. A portion of the first cables 125, such as an end of the cable, can be coupled with the trailing edge 145 of the wing 100, with a beam 110 that is disposed in the wing 100 closest to the trailing edge 145, an upper surface 115 of the wing 100, with a point on the wing 100 that is 5-20% of the chord from the trailing edge 45 of the wing. One or multiple second cables 125 can extend from the rigid spar 105 downwards towards a bottom surface 115 of the wing 100 to a point or to multiple points, and from the point or points towards the trailing edge 145 of the wing. A portion of the second cables 125, such as an end of the second cables, can be coupled with the trailing edge 145 of the wing 100, with beam 110 that is disposed in the wing 100 closest to the trailing edge 145, with an upper surface 115 of the wing 100, with a point on the wing 100 that is 5-20% of the chord from the trailing edge 45 of the wing.

The first cables 125 and the second cables 125 can be tightened and loosed together to control the camber of the wing 100. The first cables 125 and the second cables 125 can provide tension to the trailing edge 145 of the wing 100 such that the wing 100 can be held in a particular shape, form, or at a particular camber. To adjust the camber, the first cables and the second cables can increase a pulling or tension force on the trailing edge 145 of the wing 100 or decrease a pulling or tension force on the trailing edge 145 of the wing 100.

For example, the first cables 125 can loosen while the second cables 125 can tighten to deflect, bend, or move the trailing edge 145 of the wing 100 relative to the leading edge 140. Loosening the first cables 125 and tightening the second cables 125 can decrease negative camber of the wing 100, create positive camber, or increase the positive camber of the wing 100. Furthermore, the first cables 125 can tighten while the second cables 125 can loosen to deflect, bend, or move the trailing edge 145 of the wing 100 relative to the leading edge 140. Tightening the first cables 125 and loosening the second cables 125 can decrease positive camber, create negative camber, or increase negative camber of the wing 100. The first and second cables 125 can be tightened and loosed together to control, hold, or change the camber of the wing 100. The first and second cables 125 can change tension simultaneously, at the same time, together, concurrently, at the same time during a time period.

The wing 100 can include an arm, support arm, member, or component 130. The arm 130 can be coupled with the rigid spar 105. The arm 130 can be supported by the rigid spar 105. The arm 130 can be supported by the fuselage of the vehicle through the rigid spar 105, for example, the arm 130 can be supported by the rigid spar 105 and the rigid spar 105 can be supported by the fuselage of the vehicle. The support arm 130 can extend from the rigid spar 105 below a chord of the wing. The arm 130 can extend below a chord of the wing 100, below the bottom surface 115 of the wing 100, towards a ground surface under the vehicle.

At least one propulsion system 135 can be coupled with the arm 130. The at least one propulsion system 135 can be coupled with the rigid spar 105, e.g., directly coupled with the rigid spar 105 or coupled with the rigid spar 105 through the arm 130. The propulsion system 135 can be supported by the arm 130. The propulsion system 135 can be disposed on the arm 130 below the bottom surface of the wing 100 or below a chord of the wing 100. The arm 130 can include one or multiple propulsion systems 135. For example, one arm 130 can include one, two, three, or any number of propulsion systems 135. The wing 100 can include multiple arms 130, each arm 130 including one, two, or any number or propulsion systems 135. The propulsion system 135 can be distributed electric propulsion, propellers, fans, blades, fixed propellers, variable pitch propellers, ducted fans, or any other type of thrust producing component.

Referring now to FIG. 2, among others, the wing 100 including the rigid spar 105, the beams 110 that inflate, and the component 125 to deflect the wing 100 for STOL is shown. FIG. 2 depicts a cross-section of the wing 100. In FIG. 2, the components 125 can deflect the trailing edge 145 of the wing 100 relative to the leading edge 140 of the wing 100 such that the airstream or slipstream created by the propulsion system 135 is diverted downwards towards a surface under the vehicle. This can produce both forwards thrust and upwards lift or thrust, enabling the vehicle to perform a STOL. The components 125 can apply a force to the trailing edge 145 of the wing 100 to curve the shape of the wing 100 formed by the beams 110. The components 125 can deflect the trailing edge 145 relative to the leading edge 140 such that an inner angle between the leading edge 140 and the trailing edge 145 is 130-140 degrees. The angle can be between 120-150 degrees. The angle can be less than 120 degrees. The angle can be greater than 150 degrees.

The vehicle can actuate the propulsion system 135 and deflect the trailing edge 145 at the same time, simultaneously, or concurrently so that the vehicle can perform STOL. The airstream or slipstream created by the propulsion system 135 can be directed downwards by the wing 100 so that the vehicle can perform STOL. The propulsion system 135 configured to actuate while the trailing edge 145 of the wing is deflected relative to the leading edge 140 of the wing 100 to perform a take-off or landing on a runway of a length. The length can be equal to or less than 2,000 feet (610 meters). The length can be equal to or less than 1,500 feet (457 meters). The length can be equal to or less than 1,000 feet (305 meters). The length can be equal to or less than 750 feet (229 meters).

Referring now to FIG. 3, among others, the wing 100 including the rigid spar 105, beams 110 that inflate, and the component 125 to deflect the wing for VTOL is shown. FIG. 3 depicts a cross-section of the wing 100. In FIG. 3, the components 125 can deflect the trailing edge 145 of the wing 100 relative to the leading edge 140 of the wing 100 such that the airstream or slipstream created by the propulsion system 135 is diverted downwards towards a surface under the vehicle to produce upwards lift or thrust, enabling the vehicle to perform a VTOL. The components 125 can apply a force to the trailing edge 145 of the wing 100 to curve the shape of the wing 100 formed by the beams 110 to perform VTOL. The propulsion system 135 can be configured to actuate while the trailing edge 145 of the wing 100 is deflected relative to the leading edge 140 of the wing 100 at an angle between seventy and ninety degrees to perform a vertical take-off or landing. The components 125 can deflect the trailing edge 145 relative to the leading edge 140 such that an inner angle between the leading edge 140 and the trailing edge 145 is 90-110 degrees. The angle can be between 80-120 degrees. The angle can be less than 80 degrees. The angle can be greater than 120 degrees.

Referring generally to FIGS. 1-3, among others, the beams 110 and the rigid spar 105 are shown to bend and curve. For example, in FIG. 1 the beams 110 and the rigid spar 105 are disposed on a straight line (e.g., a line tangent to the circular cross sections of the beams 110 and the rigid spar 105), however, in FIGS. 2 and 3, a line tangent to the circular cross sections of the beams 110 and the rigid spar 105 is curved to form varying angles. The angles can be formed relative to the leading edge 140 of the wing. The angles can be formed relative to a longitudinal axis or a bottom surface of a vehicle. The angles can be formed relative to the rigid spar 105.

Responsive to the components 125 causing the wing 100 to bend, a portion of the beams 110 can move in a direction while a portion of the beams 110 may remain fixed in place. The rigid spar 105 may remain in place when the wing 100 bends. The beams 110 immediately on either side of the rigid spar 105 may not move when the wing 100 bends. The amount that each beam 110 moves may be a function of the distance of the beam 110 from the rigid spar 105. For example, the beams 110 that are disposed closest to the rigid spar 105 may move the least, while the beams disposed farthest from the rigid spar 105 may move the most. Because each beam 110 may either not move, or move a distance, where the distance that each beam 110 moves increases from the rigid spar 105 to the trailing edge 145 of the wing 100, the wing 100 can take on a curved shape. When the wing 100 curves downwards, the wing 100 can curve in a direction relative to the vehicle that is towards a surface under the vehicle when the vehicle is on the ground. When the wing 100 curves upwards, the wing can curve in a direction relative to the vehicle that is away from the surface under the vehicle when the vehicle is stationary on the ground.

Figure 4:
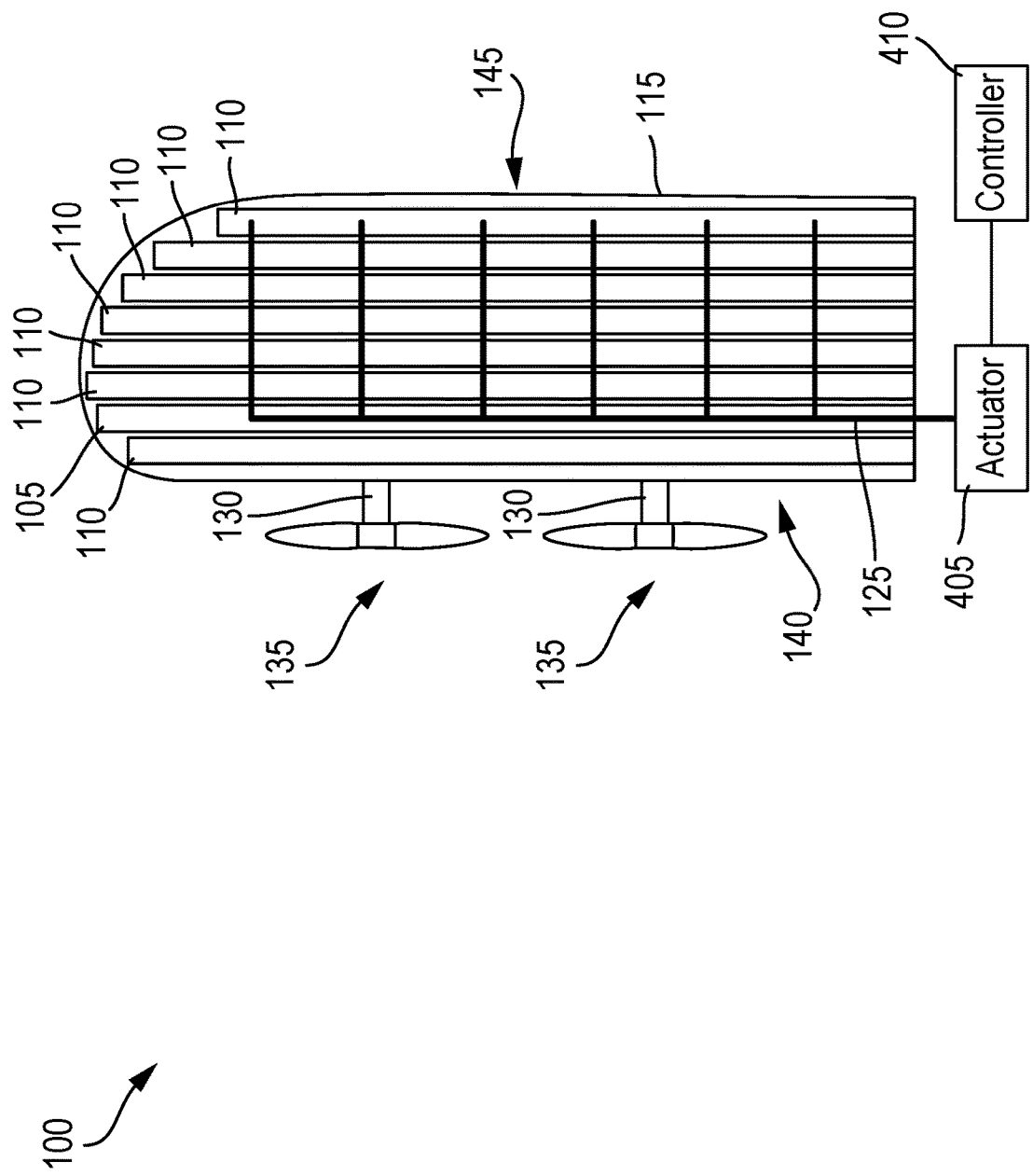
FIG. 4 depicts an example wing including cables disposed within a rigid spar and extending towards a trailing edge of the wing.

Referring now to FIG. 4, among others, the wing 100 including the cables 125 disposed within the rigid spar 105 and extending towards a trailing edge 145 of the wing 100 is shown. FIG. 4 depicts an overhead view or an underside view of the wing 100. The cables 125 can be coupled with an actuator 405. The actuator 405 can be configured to tighten or loosen the cables 125. The actuator 405 can individually tighten or loosen each cable 125. The actuator 405 can tighten or loosen cables 125 in sets, e.g., tighten a top set of cables 125 and loosen a bottom set of cables 125. The actuator 405 can be disposed in a fuselage of the vehicle. The actuator 405 can be disposed within the wing 100 or within a base of the wing 100. In some implementations, the wing 100 can include multiple actuators 405 disposed along the length of the wing 100, each actuator 405 to control one cable 125 that extends towards the trailing edge 145 of the wing 100. The actuators 405 can be coupled at multiple points on or within the rigid spar 105.

The actuator 405 can be or include at least one motor, pulley, engine, gear system, solenoid, or any other component that can tighten or loosen the cables 125, pull or release the cables 125, shorten or lengthen the cables 125. The actuators 405 can control the cables 125 or coordinate the control of the cables 125 in multiple wings 100 to cause the vehicle to roll, e.g., cause the cables 125 in one wing 100 to deflect the trailing edge 145 upwards in one wing 100 and deflect the trailing edge 145 downwards in another wing 100. The vehicle 100 can include a second set of cables 125, a second actuator 405, and a second controller 410 to control roll of the vehicle. This second set of cables 125, second actuator 405, and second controller 410 can be separate from the components for VTOL or STOL.

The actuators 405 can deflect the wing 100 downward to a particular position or angle relative to the leading edge 140 for VTOL or STOL. For example, the actuators 405 or multiple actuators 405 can deflect the trailing edge 145 of a first wing 100 disposed on a first side of a vehicle and simultaneously or concurrently deflect the trailing edge 145 of a second wing disposed on an opposite side of the vehicle to perform VTOL or STOL. A controller 410 can be disposed in the wing 100 or within the vehicle. The controller 410 can operate or control the actuators 405 to shorten or length the cables by particular amounts or deflect the trailing edge 145 of the wing 100 upwards or downwards to form a particular angle relative to the leading edge of the wing 100. For example, the controller 410 can receive at least one input, command, or message, e.g., from cockpit controls, a joystick, a keyboard, a button, etc. to operate the vehicle in STOL or VTOL or deflect the wing by a particular angle. The controller 410 can operate the actuators 405, responsive to the command, to deflect the trailing edge of the wing 100 to a particular angle or position in order to perform the particular take-off or landing indicated by the command or such that the wing 100 has an angle specified by the input to the controller 410. Furthermore, the command can indicate a roll, an amount to roll the vehicle, etc. The controller 410 can cause the actuator 405 to operate the cables 125 to cause the vehicle to roll.

The wing 100 can include two sets of cables 125. A first set of the cables can extend from the actuator 405 into the rigid spar, through the rigid spar to multiple points within the rigid spar 105, upwards towards a top surface of the wing 100 to first points, and then from the first points towards or to the trailing edge 145 of the wing 100. One cable 125, e.g., a first cable 125, of the first set of cables 125 can extend from the actuator 405 into the rigid spar 105, through the rigid spar to a point within the rigid spar 105, upwards towards a top surface of the wing 100 to a first point, and then from the first point towards or to the trailing edge 145 of the wing 100. A second set of the cables can extend from the actuator 405 into the rigid spar, through the rigid spar to multiple points within the rigid spar 105 (e.g., the same points as the first set), downwards towards a bottom surface of the wing 100 to second points, and then from the second points towards or to the trailing edge 145 of the wing 100. One cable 125, e.g., a second cable 125, of the second set of cables 125 can extend from the actuator 405 into the rigid spar 105, through the rigid spar to a point within the rigid spar 105, downwards towards a bottom surface of the wing 100 to a second point, and then from the second point towards or to the trailing edge 145 of the wing 100.

Figure 5:
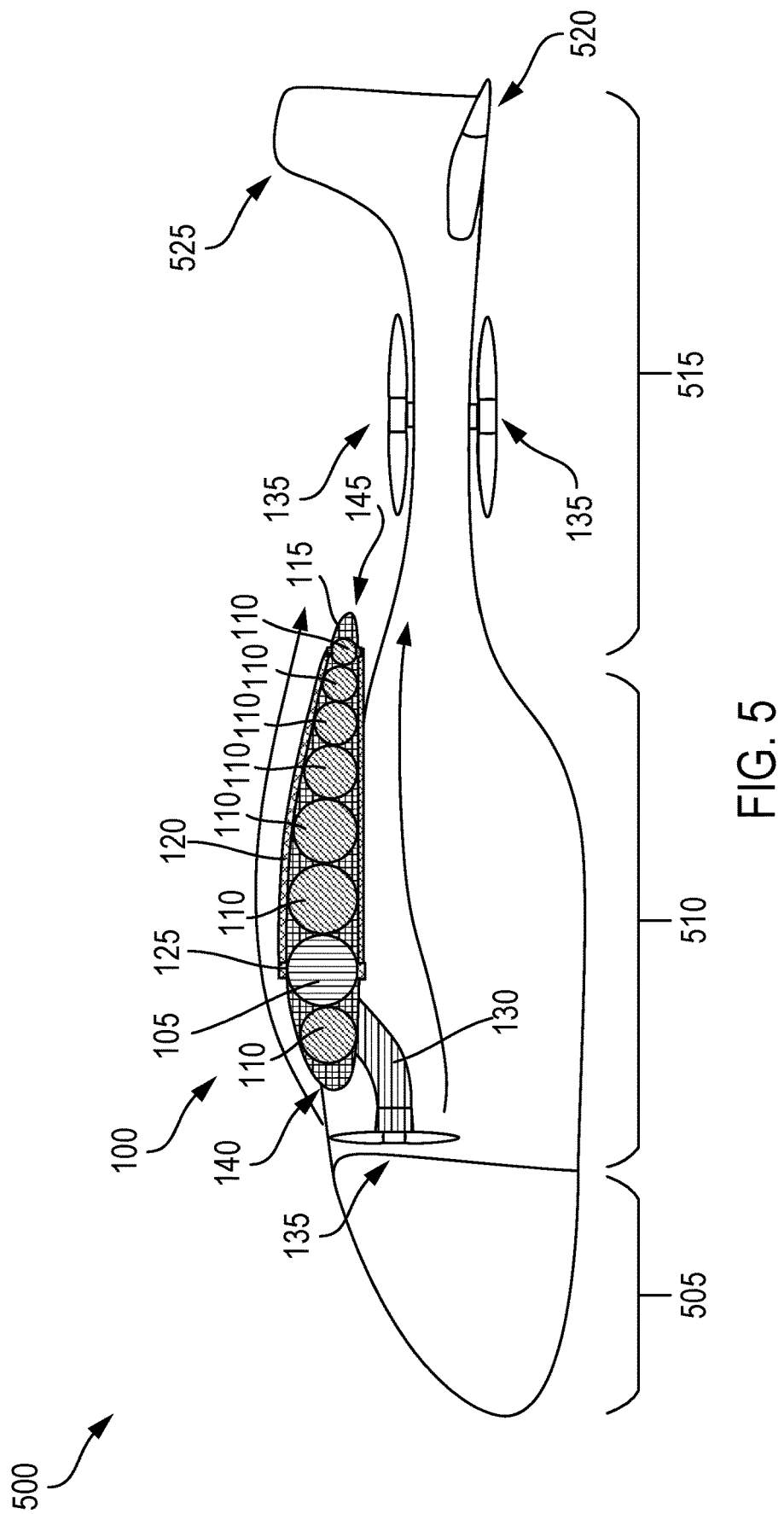
FIG. 5 depicts an example vehicle including a wing.
Figure 6:
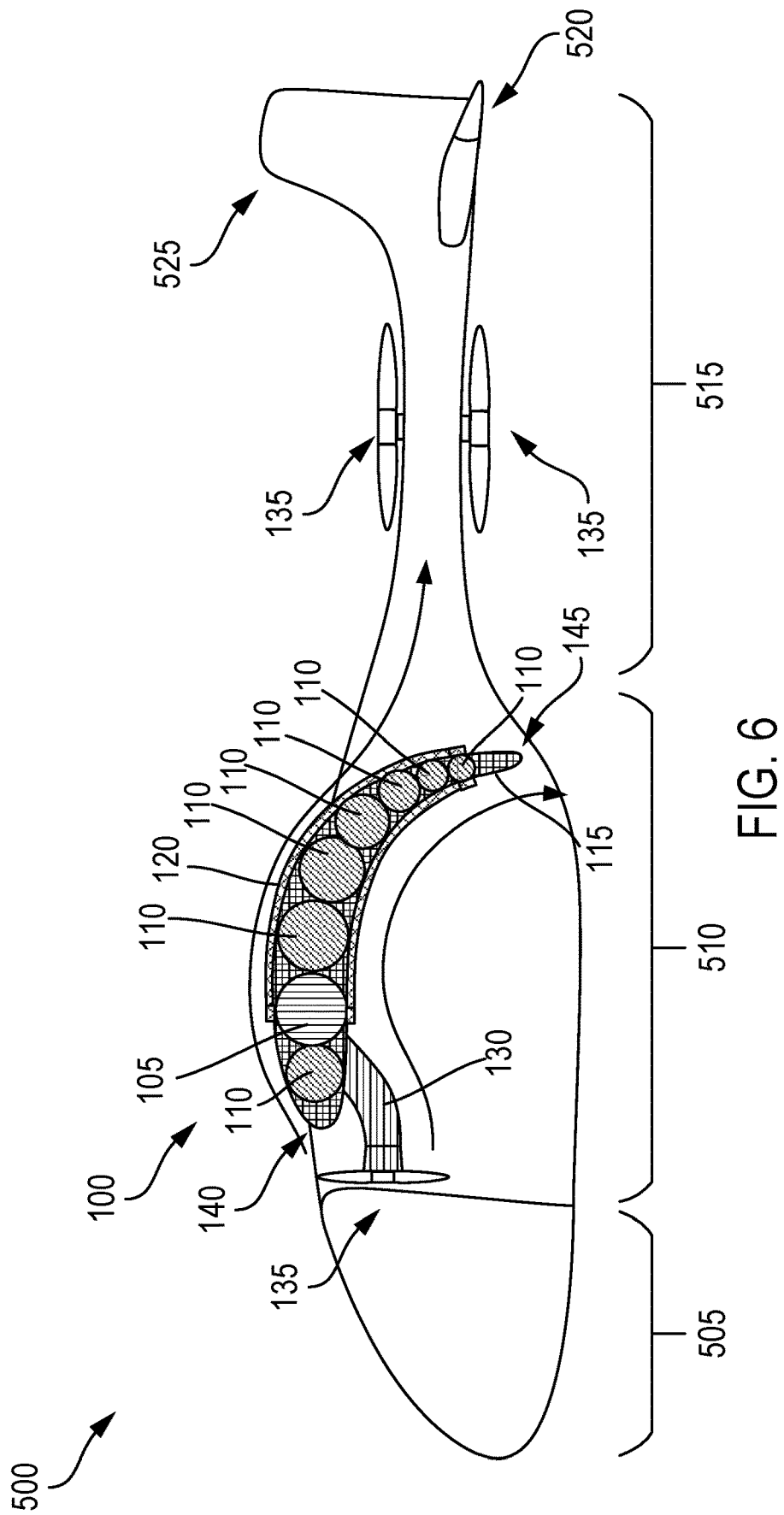
FIG. 6 depicts an example vehicle including a wing deflected by a component of the wing.

Referring now to FIGS. 5-6, among others, an example vehicle 500 including at least one wing 100 is shown. FIGS. 5-6 illustrate a cross-section of the vehicle 500. FIG. 5 illustrates the vehicle 500 in a cruise mode, where the shape of the wing 100 is created by the components 125 for cruising or flying after take-off or before landing. FIG. 6 illustrates the vehicle 500 in a VTOL mode, where the shape of the wing 100 is created by the components 125 for VTOL. The vehicle 500 can be an aircraft, such as a fixed wing aircraft. The vehicle 500 can be a drone. The vehicle 500 can be a manned or unmanned system. The vehicle 500 can be piloted by a pilot and/or co-pilot. The vehicle 500 can be fully or partially autonomous. The vehicle 500 can carry a pilot, a passenger, crew, or cargo. The vehicle 500 can carry people, equipment, supplies, weapons, or other items. While the vehicle 500 is shown as an aircraft in FIGS. 5-6, the vehicle 500 can be a boat, a plane, a helicopter, a submarine, a drone, or any other vehicle that travels through a gas or fluid.

The vehicle 500 can include a first wing 100 on a first side of the vehicle 500, and a second wing 100 on a second side of the vehicle 500. The second side of the vehicle 500 can be opposite the first side of the vehicle 500. While the vehicle 500 can include two wings, other implementations of the vehicle 500 can include four wings, six wings, or any other number of wings 100. The wings 100 can be mounted in a high wing configuration, such that when the wings 100 deflect downwards toward the surface under the vehicle 500 and the vehicle 500 is sitting on the surface, the wings 100 do not touch the ground. The position that the wing 100 is coupled with the vehicle 500 and the length or chord of the wing 100 can be selected such that when the wings 100 deflect downwards toward the surface under the vehicle 500 and the vehicle 500 is sitting on the surface, the wings 100 do not touch the ground.

The vehicle 500 can include a front portion 505, a middle portion 510, and a rear portion 515. The front portion 505 can be a cockpit portion, which can carry a person, pilot, a computer system, a navigation system, a radar system, a weather radar system, etc. The front portion 505 can be a manned portion or an unmanned portion. The middle portion 510 can carry cargo, equipment, passengers, supplies, etc. The middle portion 510 can be a fuselage or a cargo hold of the vehicle. The wings 100 can be coupled with a top side of the fuselage 510 in a high wing configuration. The back portion 515 can include a rear portion 515, such as a tail. The tail can include horizontal stabilizers 520 and/or a vertical stabilizer 525. The horizontal stabilizers 520 can include elevators and trim tabs. The vertical stabilizer 525 can include a rudder or trim tabs. Between the middle portion 510 and the stabilizers 520 and 525, the vehicle 500 can include at least one propulsion system 135.

A tail boom 515 of the vehicle 500 can include lifting propellers for pitch control of the vehicle 500, e.g., propulsion systems 135. The propulsion systems 135 can provide pitch control for VTOL, and may or may not be used during STOL. A first propulsion system 135 can be coupled with a top side of the tail 515 away from the surface under the vehicle 500. A second propulsion system 135 can be coupled with a bottom side of the tail 515 facing the surface under the vehicle 500. The propulsion systems 135 can be lifting propulsors that give the vehicle pitch control when the vehicle is performing a VTOL or STOL. For example, during VTOL, there may be no or little lift over the horizontal stabilizers or elevators, and therefore, the propulsions systems 135 can give the tail 515 lift. The lifting propulsion system 135 can be coupled with the vehicle 500 at a variety of locations, e.g., on the nose or on the front portion 505 of the vehicle, on the fuselage 510, or on the rear portion or tail of the vehicle 500. For example, the propulsions system 135 can be coupled with points on the vertical stabilizer 525 or the horizontal stabilizer 520. If the vehicle 500 only performs STOL, and not VTOL, the vehicle 500 may not include any vertical propulsion systems 135. For example, if the airflow over the horizontal stabilizers 520 provide pitch control, the vehicle 500 may not include any vertical propulsion systems 135.

During a take-off or landing, the controller 410 can operate the propulsion systems 134 and the components 125 together to execute a landing or take-off. For example, the controller 410 can receive an input from a user to perform a VTOL or STOL. If the controller 410 receives an input to perform VTOL, the controller 410 can concurrently, simultaneously, or during the same period of time, operate the actuators 405 to bend each wing 100 to an angle for VTOL, operate the propulsion systems 135 of each wing 100 to generate lift, and operate the propulsion systems 130 on the tail 515 of the vehicle 500. If the controller 410 receives an input to perform STOL, the controller 410 can concurrently, simultaneously, or during the same period of time, operate the actuators 405 to bend each wing 100 to an angle for STOL, and operate the propulsion systems 135 of each wing 100 to generate lift.

Figure 7:
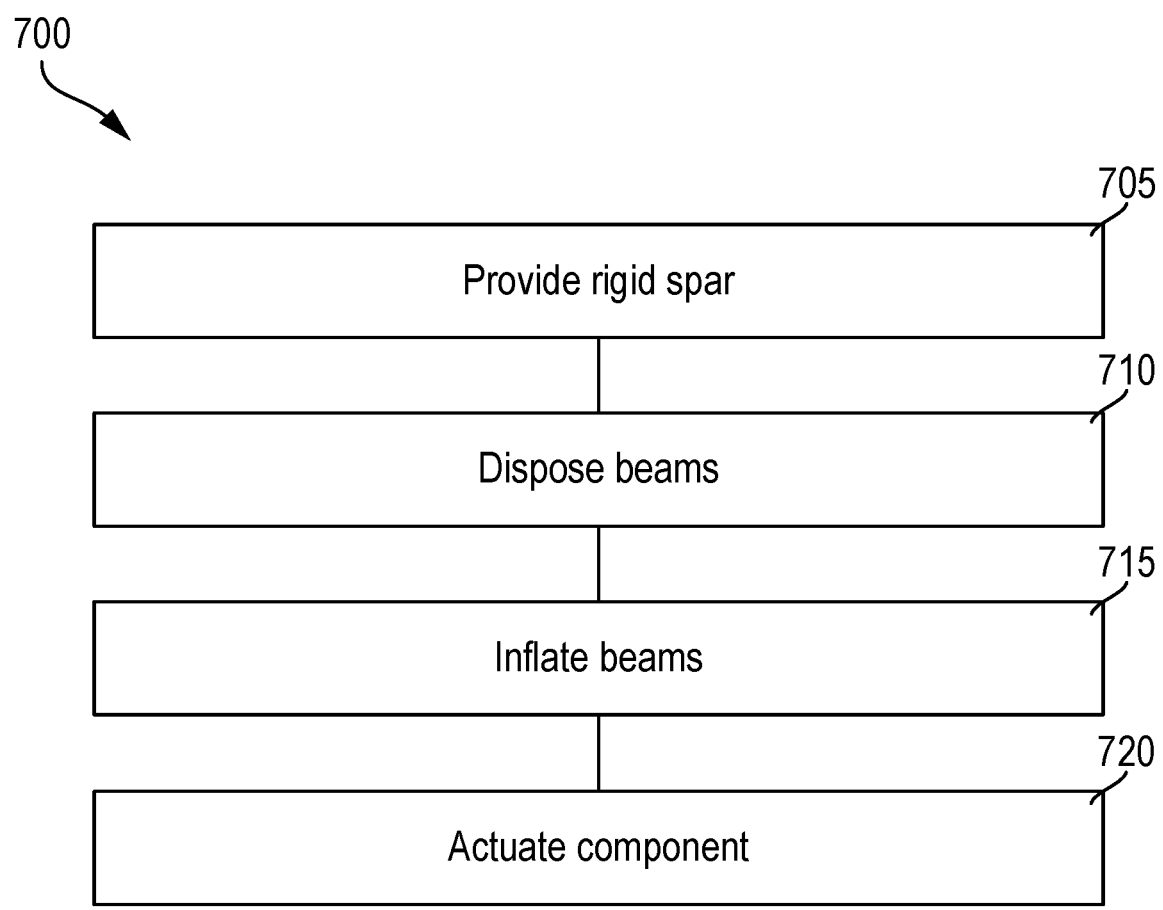
FIG. 7 depicts an example method of a wing of a vehicle.

Referring now to FIG. 7, among others, an example method 700 of the wing 100 of the vehicle 500 is shown. The method 700 can be performed by a manufacturing system or apparatus, an assembly system or apparatus, the wing 100, the vehicle 500, the controller 410, the actuator 405, a manufacturing individual or person, a maintenance or service individual or person. The method 700 can include an ACT 705 of providing a rigid spar. The method 700 can include an ACT 710 of disposing beams. The method 700 can include an ACT 715 of inflating beams. The method 700 can include an ACT 720 of actuating a component.

At ACT 705, the method 700 can include providing a rigid spar 105. The method 700 can include disposing the rigid spar 105 within a wing 100. The method 700 can include disposing multiple rigid spars 105, e.g., multiple rigid spars 105 within a single wing 100 or a first rigid spar 105 for a first wing 100 and a second rigid spar 105 for a second wing 100. For example, the rigid spar 105 can be an aluminum, carbon fiber, or plastic support member for the wing 100. The rigid spar 105 can be hollow or include one or more cavities, conduit, or openings such that cables 125 or wires can run through an inner portion of the rigid spar 105. The rigid spar 105 can be coupled with the fuselage 510 of the vehicle 500. The rigid spar 105 can extend outwards away from the side of the fuselage 510. The rigid spar 105 can extend at an angle from a longitudinal axis of the vehicle 500. For example, the rigid spar 105 can extend at an angle perpendicular to the longitudinal axis of the vehicle 500. The rigid spar 105 can extend away from the fuselage 510 at an angle towards the tail 515 of the vehicle relative. The angle, relative to the longitudinal axis of the vehicle 500 can be 60-70 degrees, 55-75 degrees, 50-80 degrees, less than 50 degrees, more than 80 degrees.

At ACT 710, the method 700 can include disposing beams 110. The beams 110 can be disposed from the leading edge 140 of the wing 100 to the trailing edge 145 of the wing 100. The beams 110 can be disposed parallel to the rigid spar 105. The beams 110 can be disposed perpendicular to the fuselage 510 of the vehicle 500. For example, a longitudinal axis of the beams 110 can be parallel to a longitudinal axis of the rigid spar 105. The longitudinal axis of the beams 110 can be perpendicular to the longitudinal axis of the vehicle 500. The beams 110 may or may not be coupled with the fuselage 510 of the vehicle 500. The beams 110 can be fully enclosed within the wing 100, and may not extend into, or be supported by, the fuselage 510 of the vehicle 500. The beams 110 can extend outwards away from the side of the fuselage 510. The beams 110 can extend at an angle from a longitudinal axis of the vehicle 500. For example, the beams 110 can extend at an angle perpendicular to the longitudinal axis of the vehicle 500. The beams 110 can extend away from the fuselage 510 at an angle towards the tail 515 of the vehicle relative. The angle, relative to the longitudinal axis of the vehicle 500 can be 60-70 degrees, 55-75 degrees, 50-80 degrees, less than 50 degrees, more than 80 degrees.

At ACT 715, the method 700 can include inflating the beams 110. The beams 110 can be inflated with a gas, such as air, helium, or any other gas. A pump, compressor, or other tool or apparatus can supply, pump, or compress the gas into the beams 110. The beams 110 can be airtight or gastight, and can hold the gas and be pressurized. Each beam 110 can be pressurized individually. In some implementations, each beam 110 is separate. In some implementations, the beams 110 are connected such that the beams 110 are pressurized together.

At ACT 720, the method 700 can include actuating the component 125. The method 700 can include actuating one or multiple components 125 together to curve the wing 100 downwards, e.g., bend the trailing edge 145 of the wing 100 downwards while the leading edge 140 remains unchanged. The curve of the wing 100 can be a curve formed by the beams 110 and the rigid spar 105 moving downwards. The beams 110 and the rigid spar 105 can include curved surfaces (e.g., circular or oval shaped cross sections) that can roll on each other to change the shape of the wing 100.

The component 125 can apply a tension or tensile force to the wing 100 on a top surface and a bottom surface of the wing. Based on a difference between the tensile forces, the wing 100 can curve upwards or downwards. If the tensile forces between the sides of the wing 100 are equal, the wing 100 may remain in a cruise or normal shape. If component 125 increases the bottom tensile force and reduces the upper tensile force, the wing 100 can curve downwards towards a surface under the vehicle. If the bottom tensile force is decreased and the upper tensile force is increased, the wing 100 can curve upwards. The components 125 can be cables that extend from the rigid spar 105 on the top side of the wing 100 through a top sleeve 120 and a bottom side of the wing 100 through a bottom sleeve 120. The cables 125 can couple with the trailing edge 145 of the wing, e.g., with a beam 110 closest to the trailing edge of the wing 100. The cables 125 can be tightened or loosened together to cause the wing 100 to morph, change shape, curve upwards, curve downwards, etc.

The component 125 can be actuated by the controller 410. The controller 410 can operate the actuator 405 to operate the vehicle 500 in a cruise or land mode where the beams and rigid spar 105 are disposed on a straight line, a STOL mode where the wing 100 bends downwards at an angle between 30-60 degrees relative to the leading edge 150 of the wing, and a VTOL mode where the wing 100 bends downwards at an angle between 70-90 degrees relative to the leading edge 150 of the wing. The controller 410 can make particular angle adjustments to the curve of the wing 100 to cause the vehicle 500 to roll, e.g., the controller 410 can create positive camber in a first wing 100 and negative camber in a second wing 100 to cause the vehicle 500 to roll, the controller 410 can create a first level of positive camber in a first wing 100 and a second level of positive camber in a second wing 100 to cause the vehicle 500 to roll, or the controller 410 can create a first level of negative camber in a first wing 100 and a negative level of positive camber in a second wing 100 to cause the vehicle 500 to roll.

Figure 8:
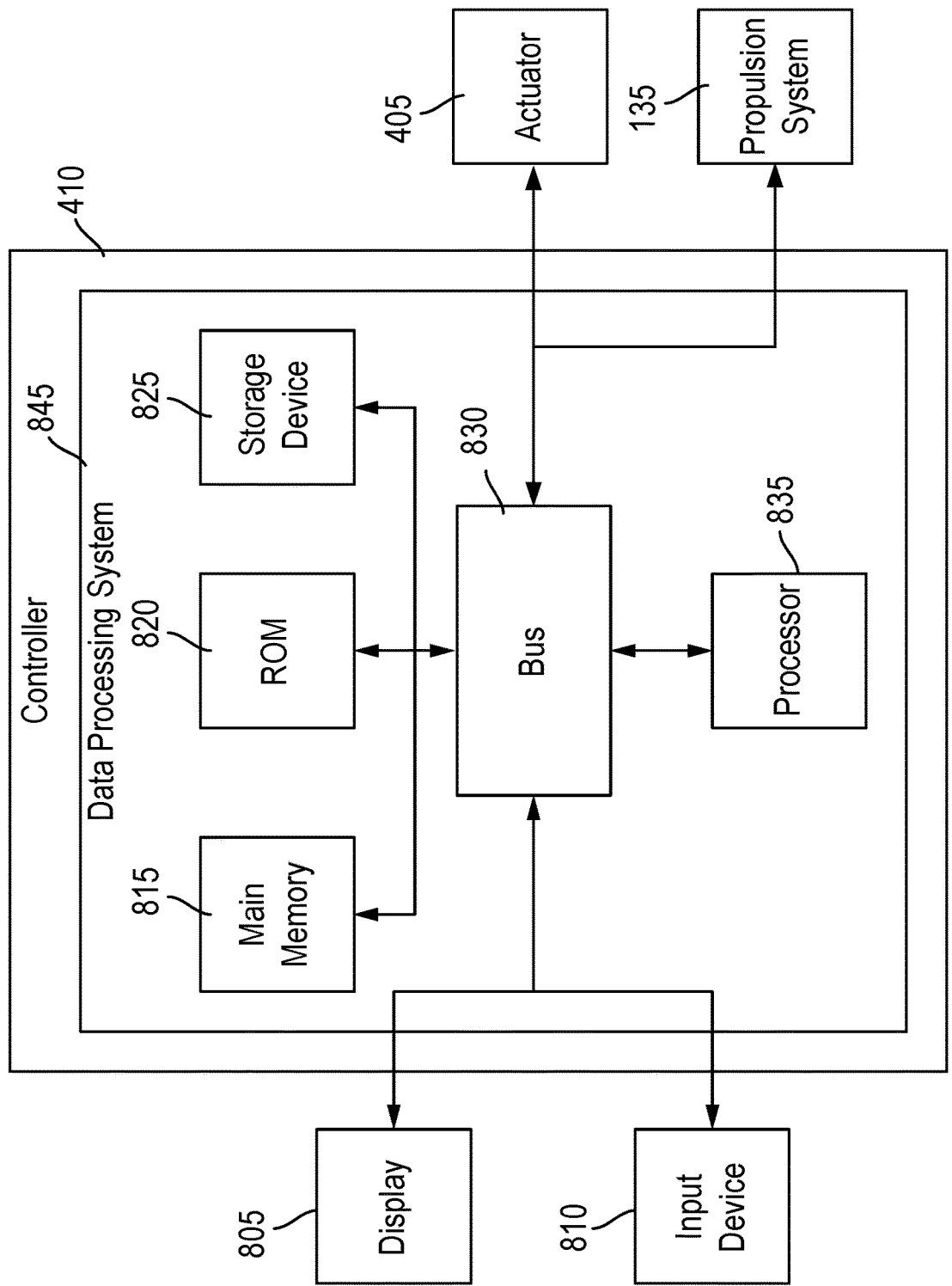
FIG. 8 depicts an architecture for a controller that can be employed to implement elements of the systems and methods described and illustrated herein.

FIG. 8 depicts an example block diagram of the controller 410. The controller 410 can include the data processing system 845. FIG. 8 depicts a computer system that can include or be used to implement a data processing system or its components. The data processing system 845 includes at least one bus 830 or other communication component for communicating information and at least one processor 835 or processing circuit coupled to the bus 830 for processing information. The data processing system 845 can also include one or more processors 835 or processing circuits coupled to the bus for processing information. The data processing system 845 can include at least one main memory 815, such as a random access memory (RAM) or other dynamic storage device, coupled to the bus 830 for storing information, and instructions to be executed by the processor 835. The main memory 815 can be used for storing information during execution of instructions by the processor 835. The data processing system 845 can further include at least one read only memory (ROM) 820 or other static storage device coupled to the bus 830 for storing static information and instructions for the processor 835. A storage device 825, such as a solid state device, magnetic disk or optical disk, can be coupled to the bus 830 to persistently store information and instructions. Furthermore, the actuator 405 and/or the propulsion system 135 can be coupled with the bus 830.

The data processing system 845 may be coupled via the bus 930 to a display 905, such as a liquid crystal display, or active matrix display, for displaying information to a user such as a pilot, co-pilot, operator, drone operator, or other end user. An input device 810, such as a keyboard or voice interface may be coupled to the bus 830 for communicating information and commands to the processor 835. The input device 810 can include a touch screen display 805. The input device 810 can also include a cursor control, such as a mouse, a trackball, or cursor direction keys, for communicating direction information and command selections to the processor 835 and for controlling cursor movement on the display 905.

The processes, systems and methods described herein can be implemented by the data processing system 845 in response to the processor 835 executing an arrangement of instructions contained in main memory 815. Such instructions can be read into main memory 815 from another computer-readable medium, such as the storage device 825. Execution of the arrangement of instructions contained in main memory 815 causes the data processing system 845 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:
1. A wing of a vehicle, comprising:
a rigid spar;
a plurality of beams configured to inflate with a gas, the plurality of beams disposed from a leading edge of the wing to a trailing edge of the wing;

a plurality of cables that extend from the rigid spar to an outer surface of the wing, at least one of the plurality of cables coupled with the rigid spar and coupled with the trailing edge of the wing, the at least one of the plurality of cables to deflect the trailing edge of the wing relative to the leading edge and curve the plurality of beams; and a sleeve coupled on the outer surface of the wing, wherein the plurality of cables are disposed within the sleeve.

2. The wing of claim 1, comprising:
the at least one of the plurality of cables to apply a force to the trailing edge of the wing to curve a shape of the wing formed by the plurality of beams.

3. The wing of claim 1, comprising:
a propulsion system coupled with the rigid spar.

4. The wing of claim 1, comprising:
a distributed electric propulsion system coupled with the rigid spar,
the distributed electric propulsion system configured to actuate while the trailing edge of the wing is deflected relative to the leading edge of the wing at an angle between seventy and ninety degrees to perform a vertical take-off or landing.

5. The wing of claim 1, comprising:
a distributed electric propulsion system coupled with the rigid spar,
the distributed electric propulsion system configured to actuate while the trailing edge of the wing is deflected relative to the leading edge of the wing to perform a take-off or landing on a runway of a length equal to or less than 1,500 feet.

6. The wing of claim 1, wherein:
the plurality of beams form an airfoil shape.

7. The wing of claim 1, comprising:
the plurality of cables, wherein the plurality of cables extend from a base of the wing within the rigid spar, the plurality of cables comprising:
 a first cable to extend from the rigid spar toward a top of the wing to a first point, and from the first point to the trailing edge of the wing; and
 a second cable to extend from the rigid spar toward a bottom of the wing to a second point, and from the second point to the trailing edge of the wing.

8. The wing of claim 1, comprising:
the plurality of cables, comprising:
 a first plurality of cables to extend from the rigid spar towards a first surface of the wing; and
 a second plurality of cables to extend from the rigid spar towards a second surface of the wing; and
at least one actuator to:
 tighten the first plurality of cables and loosen the second plurality of cables together to control positive or negative camber of at least a portion of the trailing edge of the wing.

9. The wing of claim 1, comprising:
a support arm coupled with the rigid spar, the support arm to extend from the rigid spar below a chord of the wing; and
a propulsion system coupled with the support arm.

10. The wing of claim 1, comprising:
a sheet of fabric or an elastic material to cover the plurality of beams, the sheet of fabric or the elastic material to flex with the plurality of beams.

11. The wing of claim 1, comprising:
a cable of the plurality of cables controlled by an actuator disposed within a fuselage of the vehicle or the rigid spar of the wing, the cable to deflect the trailing edge of the wing relative to the leading edge.

12. The wing of claim 1, comprising:
a cable of the plurality of cables controlled by an actuator disposed within a fuselage of the vehicle or the rigid spar of the wing, the cable to deflect a portion of the trailing edge of the wing relative to the leading edge to cause the vehicle to roll.

13. The wing of claim 1, wherein:
the rigid spar is positioned at a maximum thickness of the wing or immediately next to a beam of the plurality of beams positioned at the maximum thickness of the wing.

14. The wing of claim 1, comprising:
a material that forms an outer surface of the wing and a cavity, the plurality of beams disposed within the cavity,
wherein the cavity is pressurized separately from the plurality of beams.

15. The wing of claim 1, comprising:
a shape memory alloy coupled with the rigid spar, the shape memory alloy to deflect the trailing edge of the wing relative to the leading edge.

16. A method, comprising:
providing a rigid spar in a wing of a vehicle;
disposing a plurality of beams from a leading edge of the wing to a trailing edge of the wing;
inflating the plurality of beams with a gas;
disposing a plurality of cables that extend from the rigid spar to an outer surface of the wing within a sleeve coupled on the outer surface of the wing; and
actuating at least one cable of the plurality of cables coupled with the rigid spar and coupled with the trailing edge of the wing to deflect the trailing edge of the wing relative to the leading edge and curve the plurality of beams.

17. The method of claim 16, comprising:
providing the plurality of cables to extend from a base of the wing within the rigid spar, wherein:
 a first cable of the plurality of cables to extend from the rigid spar toward a top of the wing to a first point, and from the first point to the trailing edge of the wing; and
 a second cable of the plurality of cables to extend from the rigid spar toward a bottom of the wing to a second point, and from the second point to the trailing edge of the wing.

18. An aircraft, comprising:
a wing, comprising:
 a rigid spar;
 a propulsion system coupled with the rigid spar;
 a plurality of beams configured to inflate with a gas, the plurality of beams disposed from a leading edge of the wing to a trailing edge of the wing;
 a plurality of cables to extend from a base of the wing within the rigid spar, the plurality of cables comprising:
  a first cable to extend from the rigid spar toward a top of the wing to a first point, and from the first point to the trailing edge of the wing; and
  a second cable to extend from the rigid spar toward a bottom of the wing to a second point, and from the second point to the trailing edge of the wing;
 at least one of the plurality of cables coupled with the rigid spar and with the trailing edge of the wing, the at least one of the plurality of cables to deflect the trailing edge of the wing relative to the leading edge and curve the plurality of beams.

19. The aircraft of claim 18, comprising:
a distributed electric propulsion system coupled with the rigid spar,
the distributed electric propulsion system configured to actuate while the trailing edge of the wing is deflected relative to the leading edge of the wing.

20. The aircraft of claim 18, comprising:
a distributed electric propulsion system coupled with the rigid spar,
the distributed electric propulsion system configured to actuate to create an airstream diverted downwards under the aircraft by a curved surface of the wing created by the at least one of the plurality of cables deflecting the trailing edge of the wing relative to the leading edge.

* * * * *